Dec. 8, 1931.   R. F. FREEMAN   1,835,485
LATHE FOR SHAPING FIBER CONDUITS
Filed Oct. 16, 1930   3 Sheets-Sheet 1
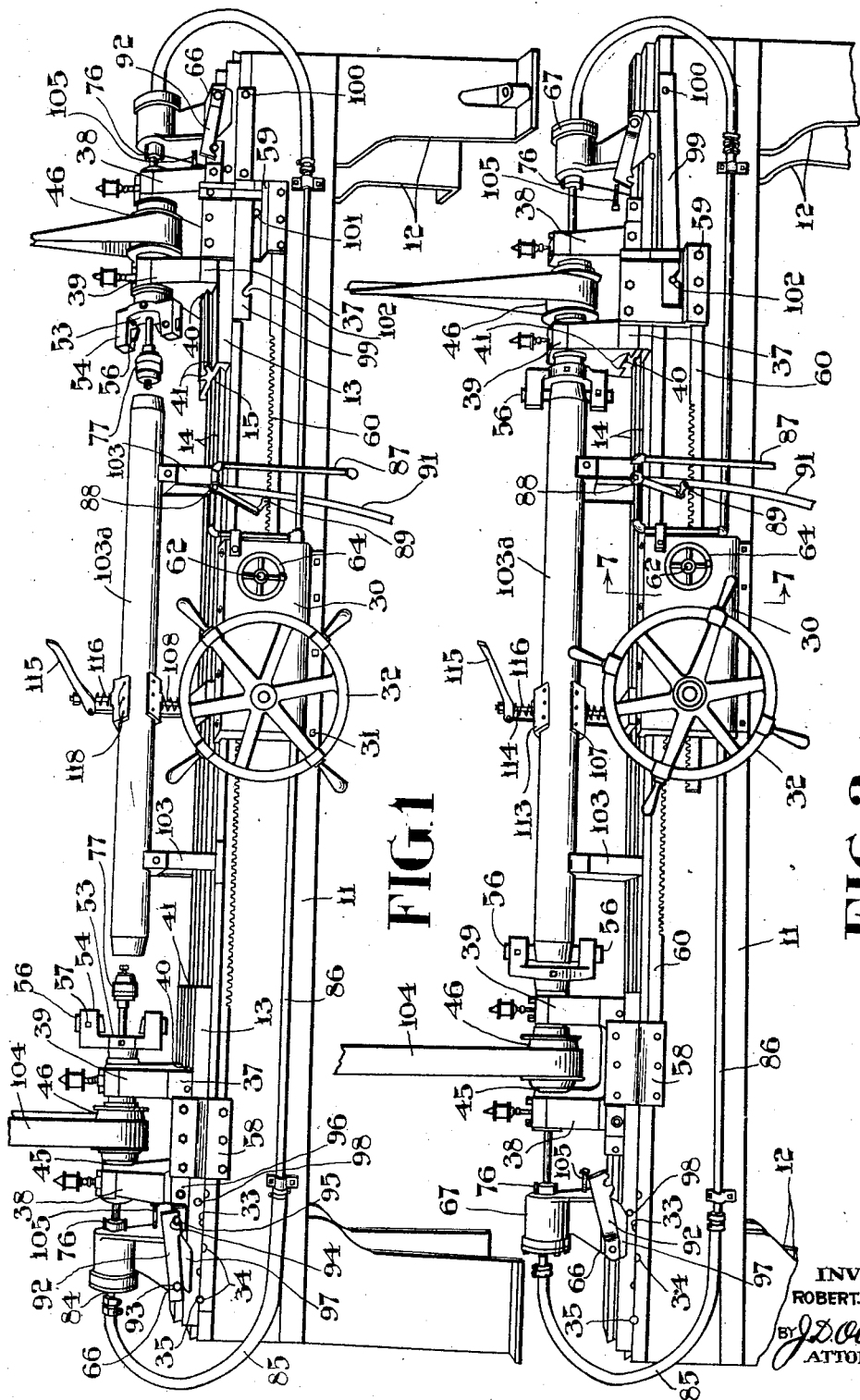
INVENTOR
ROBERT F. FREEMAN
By J.D. O'Connell
ATTORNEY

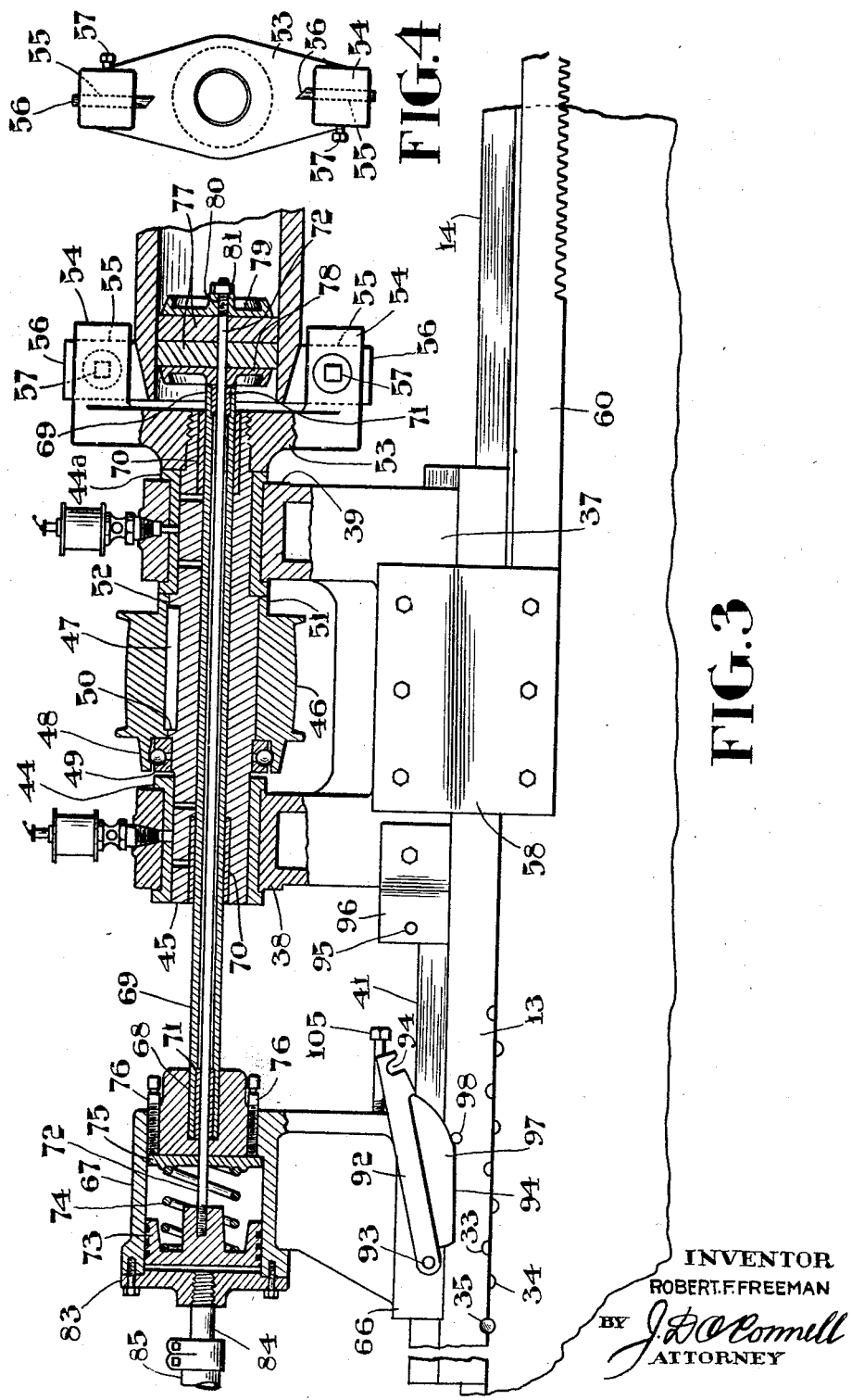

Dec. 8, 1931.  R. F. FREEMAN  1,835,485
LATHE FOR SHAPING FIBER CONDUITS
Filed Oct. 16, 1930   3 Sheets-Sheet 3
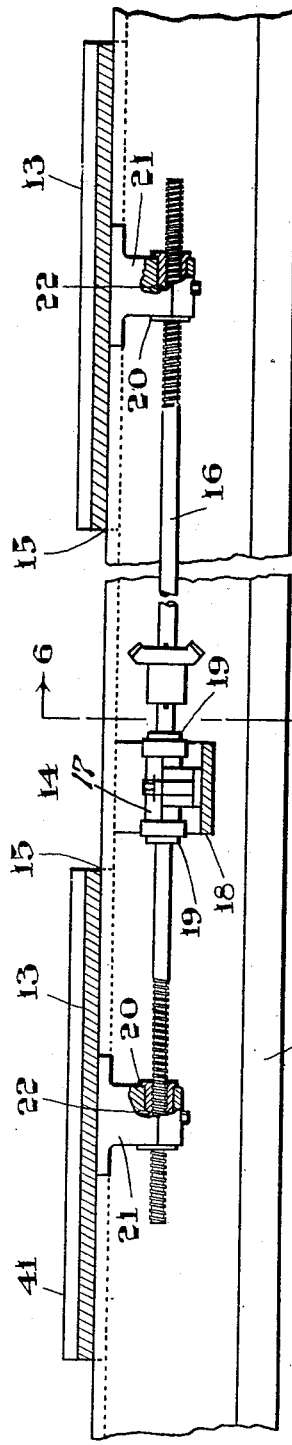
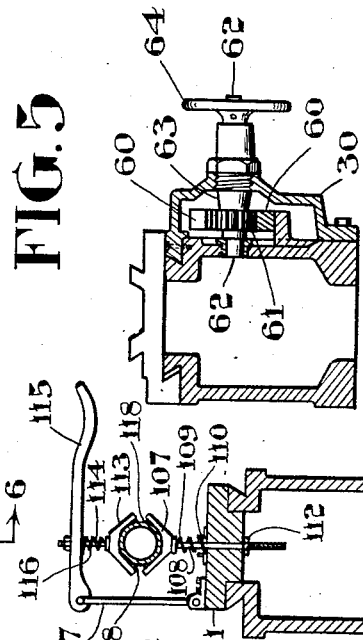
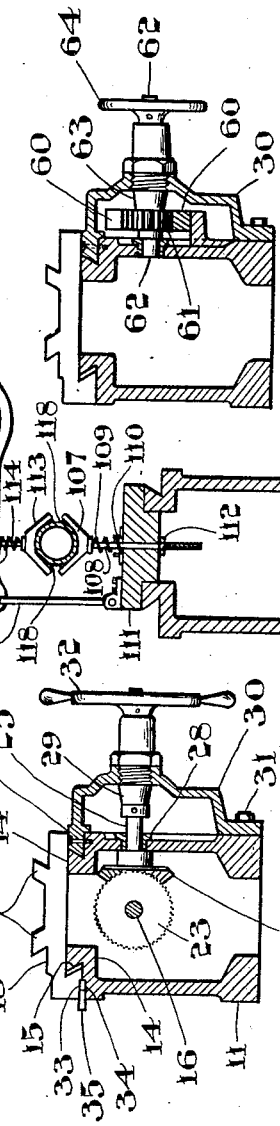
INVENTOR
ROBERT. F. FREEMAN
BY *J.D.O'Connell*
ATTORNEY Patented Dec. 8, 1931

1,835,485

UNITED STATES PATENT OFFICE

ROBERT E. FREEMAN, OF CORNWALL, ONTARIO, CANADA

LATHE FOR SHAPING FIBER CONDUITS

Application filed October 16, 1930. Serial No. 489,175.

This invention relates to lathes and particularly to lathes for turning tapers on the ends of sections of fiber conduit preparatory to joining said sections.

In joining sections of fiber conduit, it is customary to taper the ends of the sections for insertion into correspondingly tapered ends of an interposed coupling sleeve made of the same material. It is essential that the tapered ends be of uniform wall thickness and that the tapered surface be formed concentric with the bore of the sections. This is necessary in order to avoid, in the coupling of the sections, the presence of projecting ledges that would interfere with threading or pulling of cables or like elements through the aligned bores of the connected sections. At present the ends of the sections are tapered by placing one end at a time in a chuck and then moving the chuck forwardly against a revolving cutter which forms the tapered surface. The section to be tapered is centered by engaging the chuck with the outer surface and it sometimes happens that this surface is distorted in shape or presents irregularities such as excess deposits of tar or other saturating material; lack of concentricity etc. The result is that the tapered surface is not always concentric with the bore of the section and, as previously explained, this gives rise to difficulties in connecting the sections together to form a conduit for cables or the like.

The foregoing and other inherent disadvantages characteristic of the present method of tapering the ends of fiber conduit are eliminated in accordance with the present invention by providing novel chuck or centering supports adapted to be introduced into opposite ends of the conduit and expanded into yielding engagement with the inner conduit wall surface. Each centering device includes a body of soft material such as rubber which is sufficiently yieldable to absorb any irregularities presented by the inner wall of the conduit such as excess deposits of saturating material or lack of concentricity with reference to the bore of the conduit. The extent to which the centering devices are expanded is subject to positive control in order to prevent bursting of the conduits by excessive pressure.

Another advantage of the present invention is that the opposite ends of the conduit are tapered simultaneously through the medium of suitable cutters which are revolved in opposite directions so that the cutting friction is equalized to such an extent that very little external pressure is necessary to prevent turning of the conduit.

Other advantages and characteristic features of the invention as well as the details of construction, combination and arrangement of parts will be more readily understood from the following detailed description taken in connection with the accompanying drawings, wherein, Figure 1 is a perspective view of a lathe constructed in accordance with this invention. In this view the cutters and the centering supports or chucks are shown in their starting positions.

Figure 2 is a view similar to Figure 1 but showing the cutters and the centering supports or chucks in operative engagement with the ends of the conduit to be tapered.

Figure 3 is a view partly in side elevation and partly in vertical section of a cutter and chuck assembly provided in accordance with this invention.

Figure 4 is a face view of a cutter head showing the manner of attaching the cutter thereto.

Figure 5 is a longitudinal sectional view through a part of a lathe bed showing the manner of supporting and operating the carriage on which the cutters and chucks are arranged.

Figure 6 is a transverse sectional view through the lathe bed taken along the line 6—6 of Figure 5.

Figure 7 is a view similar to Figure 6 but taken along the line 7—7 of Figure 2. The showing contained in this view is confined essentially to a rack and pin mechanism for adjusting the cutter and chuck appliances with reference to the lathe bed.

Figure 8 is a transverse sectional view through the lathe bed showing the arrangement of a conduit holding device associated therewith.

Referring more particularly to the drawings, 11 designates a lathe bed mounted on suitable supporting legs 12. At each end the bed supports a sliding carriage 13 on which the cutter and chuck appliances hereinafter described are arranged. Spaced guide rails 14 extend along the upper surface of the bed and have their outer sides bevelled to slidingly engage the correspondingly bevelled side walls of a guide groove 15 formed in the bottom surface of each carriage 13. As shown to advantage in Figs. 5 and 6, the two carriages are connected by a screw shaft 16 mounted to rotate in a bearing 17 fixed to a support 18 which forms part of the lathe bed. The shaft is held against longitudinal movement by abutments 19 engaging the bearing 17 and is provided with oppositely threaded ends engaging nuts 20 carried by suitable brackets 21 suspended from the lower portions of the carriages. The nuts are held against turning movement by suitable dowels 22. A bevel gear 23 is fixed to shaft 16 and meshes with a bevel gear 24 fixed to the inner end of a shaft 25. Shaft 25 rotates in bushings 28 and 29 carried respectively by the lathe bed and by an apron plate 30. The apron plate is preferably shaped and arranged as shown in Fig. 6 and has its upper and lower edge portions bolted to the lathe bed as indicated at 31. At its outer end the shaft 25 is equipped with a hand wheel 32 by means of which said shaft may be turned to move the carriages 13 inwardly and outwardly on the lathe bed. One of the carriages may be provided (as shown in Figs. 1, 2 and 6) with a series of semi-circular notches 33 adapted, during adjustment of the carriage, to be brought into selective registration with a series of complementary notches 34 formed in the upper edge of the lathe bed. When one of the notches 33 is aligned with a complementary notch 34, a circular opening is provided for the reception of a tapered locking pin 35 by means of which the carriages are secured against movement on the lathe bed subsequent to adjustment of the carriages by operation of the hand wheel 32.

A cutter assembly is associated with each carriage 13. Each assembly includes a cutter carrier presenting a base plate 37 and a pair of spaced sectional bearing members 38 and 39. The base plate is formed with a guide groove 40 receiving a pair of guide rails 41 extending along the upper surface of the carriage. The outer inclined sides of the guide rails co-operate with the correspondingly inclined side walls of the groove 40 to prevent vertical displacement of the carrier. The bearing members 38 and 39 (as shown in detail in Fig. 3) are equipped with flanged bushings 44 and 44a which serve to support the ends of a hollow rotary spindle 45. A pulley 46 is positioned between the said bearing members and is fixed to the spindle by a key 47. One end of the pulley is extended to form a housing 48 surrounding a thrust bearing 49 which is confined between the bushing 44 and a shoulder 50 on the spindle 45. The other end of the pulley is extended to form an abutment collar 51 engageable with the inner end of the bushing 44a which also engages a second shoulder 52 on the spindle. The inner end of the spindle projects beyond the bearing 39 and carries a cutter head 53 in screw threaded engagement therewith. The cutter head is formed with parallel projections 54 having suitable tool receiving slots 55 in which the taper forming cutting tools 56 are secured by set screws 57. If desired, suitable end facing and reaming cutters (not shown) may also be secured to the cutter head in appropriate positions.

One of the cutter carriers is equipped with a rack attaching plate 58 while the other carrier is equipped with a similar plate 59. The plates 58 and 59 are substantial duplicates except that the plate 59 is made somewhat larger than the plate 58 for a purpose hereinafter apparent. Upper and lower rack bars 60 are arranged with their outer ends fastened to the rack plates 58 and 59 and their inner ends passing beneath the apron plate 30 and meshing with an operating pinion 61. As shown to advantage in Fig. 7, the pinion 61 is carried by a shaft 62 journalled in suitable bearings 63 mounted, respectively, in the lathe bed and in the apron plate 30. At its outer end shaft 62 is equipped with an operating handle 64. By turning this handle the racks 60 may be operated to move the two cutter carriers inwardly and outwardly on the supporting carriages 13 in order to advance or retract the cutters with reference to the work.

Each carriage 13 is also equipped with a movable work centering support or chuck assembly including a carrier casting presenting a base plate 66 and a cylinder 67. The base plate is grooved, in the manner described in connection with the cutter carrier, to receive the guide rails 41 of the supporting carriage. The inner end wall of the cylinder 67 is provided with a socket 68 receiving one end of an elongated tube 69. This tube is slidable in suitable bushings 70 carried by the spindle 45 of the adjacent cutter assembly. Similar bushings 71 are arranged in the ends of the tube to slidably support a piston rod 72 having its inner end secured to a piston 73 operating in the cylinder 67. A coil spring 74 is confined between the piston and a movable plate 75 located adjacent the inner end of the cylinder. The position of the plate 75 may be adjusted, to vary the tension of springs 74, through the medium of suitable adjusting bolts 76. The inner end of the piston rod 72 carries an expansible centering device or chuck comprising one or more compressible rubber or similar discs 77 confined between a pair of metal clamping discs indicated at 78 and 79. The clamping disc 78 is a sliding fit on the piston rod and is located immediately adjacent the inner end of the tube 69. The clamping disc 79 is fixed to the piston rod by the screw threaded connection 80 and the retaining nut 81. When the piston rod 72 is urged toward the outer end of the cylinder by the spring 74 the clamping disc 79 serves to press the rubber or similar disc 77 against the clamping disc 78, which, in turn, is clamped against the adjacent end of the sleeve 69. The pressure thus applied causes the discs 77 to be expanded circumferentially so that the peripheral edges of these discs are projected a predetermined distance beyond the corresponding edges of the clamping discs. This peripheral expansion of the disc 77 is utilized as hereinafter set forth with reference to the complete operation of the lathe. The outer end of the cylinder 67 is closed by a removal head 83 having a fluid inlet nipple 84. This nipple is connected, by suitable flexible tubing 85, to one of the branches 86 of a fluid supply pipe 87. The pipe 87 is equipped with a three-way valve 88 provided with an operating handle 89. The valve 88 is normally positioned to supply fluid to both of the cylinders 67 so that the pistons 73 are forced towards the inner ends of the cylinders to separate the discs 78 and 79 and relieve the clamping pressure on the discs 77. When thus relieved of the clamping pressure the discs 77 contract to a normal diameter corresponding to that of the clamping discs. In the exhaust position of the valve, the fluid previously supplied to the cylinders is permitted to escape through an exhaust connection 91 whereupon the springs 74 become effective to apply the clamping pressure necessary to effect the desired expansion of the discs 77.

When the cutters and the chucks or centering supports are in the retracted position shown in Fig. 1, each chuck or centering support assembly is releasably coupled to the adjacent cutter carrier so as to move inwardly therewith when the cutter carriers are advanced towards the work by turning the wheel 64. The releasable coupling provided for this purpose comprises, in each instance, a latch lever 92 having one end pivoted to the base plate 66 of the chuck carrier as indicated at 93. The other end of the latch lever is formed with a notch 94 receiving a pin 95 carried by a plate 96 fixed to the base 97 of the adjacent cutter carrier. The levers 92 are equipped with cams 97 which, after a predetermined inward movement of the cutter carriers, are engaged by pins 98 secured to the supporting carriages 13. This engagement of the pins 98 with the cams 97 serves to lift the levers 92 out of engagement with the pins 95 so that the chuck carriers are released from the cutter carriers and remain stationary during continued inward movement of the cutter carriers. The extent to which the cutter carriers may be moved inwardly on the carriages 13, after being uncoupled from the chuck carriers, is limited by a releasable latch connection including a lever 99 having one end pivoted to the lathe bed, as indicated at 100. When the cutters are in the retracted position shown in Fig. 1, the lever 99 rests slidably on a pin 101 carried by the rack plate 59. After the cutter carriers have been moved inwardly to a predetermined extent the pin 101 engages in a notch 102 in the lever 99 and serves to prevent further inward movement of the cutter carriers. The notch 102 is shaped to permit the pin 101 to pass freely out of engagement therewith during outward movement of the cutter carriers towards the ends of the lathe bed.

When the lathe structure described in the foregoing is to be used for finishing or tapering the ends of tubular members, such, for example, as sections of fiber conduits, the complete operation is as follows. The initial position of the carriages 13 will depend upon the length of the conduit and is controllable by operation of the screw shaft 16 through the medium of the hand wheel 32. After the carriages have been adjusted to the desired position, they are locked in place by the tapered lock pin 35 previously described. The conduit to be finished or tapered is indicated at 103ª and is placed upon a plurality of supporting saddles 103 suitably attached to the lathe bed. The conduit is preferably supported so that its longitudinal axis is slightly below that of the chucks or centering supports with the result that the conduit is lifted out of engagement with the supporting saddles when the chucks or centering supports are introduced into the ends of the conduit. The wheel 64 is now operated to move the cutter carriers inwardly towards the ends of the tube or conduit and corresponding movement is simultaneously imparted to the chuck carriers through the medium of the releasable latch couplings provided between the chuck carriers and the cutter carriers. During this inward movement of the chuck carriers, the expansible chucks are introduced into the ends of the conduit, this introduction of the chuck being facilitated by suitably tapering the outer edges of the clamping discs 79. When the chucks have been projected into the tubular member or conduit to the desired extent, the cam members 97 of the latch levers 92 are brought into engagement with the pins 98 and serve to lift the latch levers out of engagement with the pins 95 thus releasing the coupling between the cutter carriers and the chuck carriers. At this time the operator moves the valve 88 to an exhaust position permitting the pressure then acting against the pistons to be released through the exhaust connection 91. The springs 74 thereupon become effective to move the pistons 73 towards the outer ends of the cylinders 67 thus causing the clamping discs 78 and 79 to expand the compressible discs 77 into gripping engagement with the inner wall of the conduit. As the cutter carriers continue to travel inwardly independently of the chuck carriers, the taper forming cutting tools 56 are brought into engagement with the ends of the conduit as shown to advantage in Fig. 2. During the cutting operation the cutting heads and the associated cutting tools revolve about a horizontal axis coinciding with the longitudinal axis of the spindle 45. This is accomplished through the agency of suitable belts 104, engaging the pulleys 46. When the cutting operation is completed, the cutter carriers are retracted by rotating the wheels 64 in the reverse direction. During this return movement the cutter carriers are brought into engagement with stop screws 105 fixed to the chuck carriers and force the latter back to their initial positions. As the cutter carriers engage said stop screws the pins 95 are brought directly below the notches 94 in the levers 92 so as to enter said notches as the cams 97 are forced backwardly out of engagement with the pins 98. In this way the cutter carriers are automatically coupled to the chuck carriers each time the carriers are returned to their starting positions. To prevent longitudinal movement of the conduit when the centering supports are engaged therewith and to prevent turning of the conduit during the cutting operation it is advisable to provide a conduit clamping or holding device. This device may consist of upper and lower yieldingly mounted plates between which the conduit is gripped as shown in Figures 1, 2 and 8. The lower plate 107 is fixed to the upper end of a stem 108 and is pressed upwardly against the conduit by a spring 109. The spring is confined between the plate and a spring seat 110 which is carried by a block 111 in which the stem is slidably mounted. Upward movement of the stem is limited by a stop nut 112.

The upper clamping plate 113, is fixed to the lower end of a vertically slidable stem 114. This stem is carried by a lever 115 and is normally pressed downwardly by a spring 116. At one end the lever is pivoted to a standard 117 carried by the block 111. In the use of this device the conduit, placed on the saddles 103, is gripped between the clamping plates by downward movement of the lever 115. In order to prevent slippage of the conduit relative to the clamping plates the latter may be provided with pins or projections 118 adapted to bite into the outer surface of the conduit.

Having thus described my invention, what I claim is:—

1. A lathe equipped with a pair of opposed work centering supports adapted to be introduced into the opposite ends of a tubular member, each support including a normally contracted centering element composed of resilient and compressible material and means for expanding said material into engagement with the inner wall of the tubular member and carriers for said centering supports slidably mounted on the lathe bed.

2. A lathe equipped with work centering supports adapted to be introduced into the ends of a tubular member, each support including a normally contracted centering element composed of resilient and compressible material, and means for compressing said material to expand same into engagement with the inner wall of the tubular member.

3. A lathe equipped with work centering supports for holding and centering a tubular member, each support including a normally contracted centering element composed of resilient and compressible material, means for introducing said supports into opposite ends of the tubular member and means for subsequently compressing said centering elements to expand the same into engagement with the inner wall of the tubular member.

4. A lathe equipped with work centering supports adapted to be introduced into the ends of a tubular member, each support including a normally contracted body of compressible material and a pair of clamping discs adapted to be forced against opposite sides of said body to expand the latter into engagement with the inner wall of the tubular member.

5. A lathe equipped with work centering supports adapted to be introduced into the ends of a tubular member, each support including a pair of clamping members and a body of compressible material arranged between said members, one of said members having a tapered outer surface to facilitate insertion of the support with reference to the tubular member, and means for forcing the clamping members against opposite sides of the interposed body of compressible material to expand said material beyond the edges of the clamping members and into engagement with the inner wall of the tubular member.

6. A lathe equipped with work centering supports adapted to be introduced into the ends of a tubular member, each support including a slidably mounted tube, a rod slidable in said tube, a clamping disc slidably mounted on the rod adjacent one end of the tube, a second clamping disc fixed to the rod in spaced relation to the first disc, a body of compressible material mounted on the rod between said discs, means for moving the tube and the rod as a unit and means for moving the rod with reference to the tube to move the clamping discs into and out of compressive engagement with the interposed body of compressible material whereby said body may be expanded to a diameter exceeding that of the clamping discs or may be permitted to contract to a diameter approximately equal to that of the clamping discs.

7. A lathe equipped as claimed in claim 6 in which the means for moving the rod with reference to the tube comprises a cylinder, a piston operating in said cylinder, and means for moving the piston in either direction with reference to said cylinder.

8. A lathe equipped with work centering supports adapted to be introduced into the ends of a tubular member, each support comprising a movable carrier including a cylinder, a piston in said cylinder, a tube having one end secured to said cylinder, a piston rod slidably mounted in the tube and having one end secured to said piston, the free end of said rod being projected beyond the free end of the tube, a clamping disc slidably mounted on the rod in proximity to the free end of said tube, a second clamping disc fixed to the rod in spaced relation to said first disc, a body of compressible material mounted on the rod between said discs and means for operating the piston to move the piston rod in either direction with reference to said tube.

9. A lathe equipped with work centering supports adapted to be introduced into the ends of a tubular member, each support comprising a slidably mounted carrier including a cylinder, a piston operating in said cylinder, a fluid supply and exhaust conduit connected to one end of the cylinder, a spring confined between the piston and the opposite end of the cylinder, a tube having one end connected to said cylinder, a rod slidably mounted in the tube and having one end connected to the piston, the free end of said rod being projected between the free end of the tube, a clamping disc slidably mounted on the rod adjacent the last mentioned end of the tube, a second clamping disc fixed to the rod in spaced relation to the first disc and a body of compressible material mounted on the rod between said discs.

10. In a lathe of the character described, the combination of a movable cutter carrier including a hollow rotary spindle, a cutter head fixed to one end of said spindle, a tube passing slidably through said spindle, a rod slidably mounted in said tube, a clamping disc slidably mounted on the rod adjacent one end of the tube, a second clamping disc fixed to the rod in spaced relation to the first disc, a body of compressible material mounted on the rod between the discs, means for causing the rod and tube to move as a unit with the cutter carrier, said means being releasable to permit subsequent independent movement of the cutter carrier, and means for moving the rod with reference to the tube to move the clamping discs into and out of compressive engagement with the interposed body of compressible material.

11. In a lathe of the character described, the combination of a movable cutter carrier including a hollow rotary spindle and a cutter head fixed to one end of the spindle, a movable cylinder, a piston in said cylinder, a tube passing slidably through the spindle and having one end secured to the cylinder, a rod slidably mounted in the tube and having one end secured to the piston, a clamping disc loosely mounted on the rod adjacent the free end of the tube, a second clamping disc fixed to the rod in spaced relation to the first disc, a body of compressible material interposed between the clamping discs, means for operating the piston to move said clamping discs into and out of compressive engagement with the interposed body of compressible material to effect radial expansion or contraction of said body and a releasable latch connection coupling the cylinder to the cutter carrier to move therewith.

12. In a lathe of the character described, the combination of a cutter carrier movable inwardly and outwardly on the lathe bed, a hollow rotary spindle journalled in said carrier, a cutter head fixed to one end of said spindle, a movable cylinder, a piston in said cylinder, a tube slidable in said spindle and having one end fixed to said cylinder, a piston rod slidable in said tube and having one end fixed to said piston, a clamping disc loosely mounted on the rod adjacent the free end of the tube, a second clamping disc fixed to the rod in spaced relation to the first disc, a body of compressible material interposed between said disc, means for operating the piston to move the clamping discs into and out of compressive engagement with the sides of the interposed body of compressible material to effect radial expansion and contraction of said body, a releasable latch connection arranged to cause the cylinder to move with the cutter carrier during inward movement of the latter on the lathe bed, and means for releasing the latch connection when the cylinder has moved inwardly a predetermined distance on the lathe bed.

13. A lathe equipped with a pair of carriages mounted to slide inwardly and outwardly on the lathe bed, said carriers being connected together for simultaneous movement and one of said carriages being provided with a plurality of notches adapted to be brought into registration with complementary notches formed in the lathe bed and a locking pin adapted to be inserted in the opening formed by the registering notches of the carriage and lathe bed to secure the carriage in different positions of adjustment.

14. A lathe equipped with a pair of carriages mounted to slide inwardly and outwardly on the lathe bed, means for operating said carriers including provision for connecting the carriages together for simultaneous inward and outward movement, means for locking the carriages in different positions of adjustment on the lathe bed, a cutter carrier slidably mounted on each carriage, means for moving the cutter carriers inwardly and outwardly on the carriages, a pin movable with one of said cutter carriers, and a lever pivoted to the lathe bed and provided with a notch engageable with said pin to limit inward movement of the carriers on the carriages.

15. A lathe equipped with a pair of carriages mounted to slide inwardly and outwardly on the lathe bed, a cutter carrier mounted to slide inwardly and outwardly on each carriage, a hollow rotary spindle journalled in the cutter carrier, a cutter head fixed to one end of said spindle, a cylinder slidably mounted on each carriage adjacent the cutter carrier, a piston in said cylinder, a tube slidable in said spindle and having one end fixed to the cylinder, a piston rod slidable in the tube and having one end fixed to the piston, a clamping disc loosely mounted on the rod adjacent the free end of the tube, a second clamping disc fixed to the rod in spaced relation to the first disc, a body of compressible material interposed between said discs, means for operating the piston to move the clamping discs into and out of compressive engagement with the interposed body of compressible material to effect radial expansion and contraction of said body, a pin carried by each cutter carrier, a pivoted lever movable with the adjacent cylinder and provided with a notch normally receiving said pin, a cam member carried by said lever and a pin on the carriage engageable with said cam member to disengage the lever with the first mentioned pin after the cylinder has been moved inwardly a predetermined distance with the cutter carrier.

16. A lathe for tapering the ends of a section of a fiber conduit including in combination a pair of conduit centering supports adapted to be introduced into opposite ends of the conduit, each support including a normally contracted and relatively soft body of compressible material, and means for expanding said body into yielding engagement with the inner wall of the conduit, a pair of cutting heads with cutters engageable with the outer surface of the end portions of the conduit, and means for simultaneously rotating said cutting heads in opposite directions.

17. A lathe equipped with means for supporting a tubular member thereon, a pair of cutters for forming tapers on the ends of said member, each cutter comprising a carrier slidably mounted on the lathe bed, a hollow spindle journalled in said carrier, and a cutter head fixed to one end of said spindle and centering devices passing loosely through the hollow spindles of the cutter and adapted to be introduced into opposite ends of the tubular member.

18. A lathe as recited in claim 17 in which each centering device comprises a normally contracted body of compressible material and a pair of clamping discs adapted to be forced against opposite sides of said body to expand same into engagement with the inner wall of the tubular member.

19. A lathe equipped with means for supporting a tubular member thereon, centering supports mounted on the lathe bed and adapted to be introduced into opposite ends of said member, a pair of rotatably mounted cutting heads slidably mounted on the lathe bed and equipped with cutters engageable with the outer terminal portions of said tubular member and means for simultaneously rotating the cutting heads in opposite directions so that the cutting friction is equalized to such an extent that very little external pressure is necessary to prevent turning of the tubular member.

In witness whereof, I have hereunto set my hand.

ROBERT F. FREEMAN.